US006175093B1

United States Patent
Cauthon et al.

(10) Patent No.: US 6,175,093 B1
(45) Date of Patent: Jan. 16, 2001

(54) METHOD FOR APPLYING A WELD OVERLAY TO A WASTAGE SUSCEPTIBLE STRUCTURE

(75) Inventors: Randall T. Cauthon, Exton; Donald Dzedzy, Glenmoore, both of PA (US); Milton A. Fong, South Windsor; William Keegan, Burlington, both of CT (US)

(73) Assignee: ABB Alstpm Power Inc., Windsor, CT (US)

( * ) Notice: Under 35 U.S.C. 154(b), the term of this patent shall be extended for 0 days.

(21) Appl. No.: 09/376,834

(22) Filed: Aug. 18, 1999

(51) Int. Cl.$^7$ ........................................ B23K 9/04
(52) U.S. Cl. .................... 219/76.14; 219/125.1; 219/137 R
(58) Field of Search ............. 219/76.14, 124.34, 219/125.1, 137 R; 228/199; 901/4, 42

(56) References Cited

U.S. PATENT DOCUMENTS

| | | | |
|---|---|---|---|
| 3,182,179 | * | 5/1965 | Anderson, Sr. ............ 219/137 R |
| 3,199,174 | * | 8/1965 | Nilsson et al. ............. 228/199 |
| 3,535,768 | * | 10/1970 | Pruitt et al. .............. 219/137 R |
| 5,356,248 | * | 10/1994 | Hillestad . |
| 5,440,099 | * | 8/1995 | Smith ..................... 219/125.1 |
| 5,550,347 | * | 8/1996 | Kasuya et al. ............ 219/137 R |
| 5,798,627 | * | 8/1998 | Gilliland et al. .......... 901/4 |

* cited by examiner

Primary Examiner—Clifford C. Shaw
(74) Attorney, Agent, or Firm—Russell W. Warnock

(57) ABSTRACT

There is provided a method of applying a weld overlay to a surface of a wastage susceptible chamber. The basic steps of the method include evaluating the post weld orientation of the surface of the wastage susceptible chamber resulting from the movement of the surface in response to the application of a weld overlay thereon and selecting characteristics of a weld overlay to be applied to the surface of the wastage susceptible chamber based upon the step of evaluating the post weld orientation of the surface of the wastage susceptible chamber. The basic steps of the method also include determining a series of weld torch engagement locations relative to the surface of the wastage susceptible chamber at which a weld torch is to be located for performing thereat welding operations which result in a weld overlay on the surface having characteristics corresponding to the predetermined weld overlay characteristics. A further basic step of the method includes positioning a weld torch at the weld torch engagement locations and controlling the weld torch to produce welds on the surface of the wastage susceptible chamber resulting in the weld overlay having characteristics corresponding to the predetermined weld overlay characteristics.

6 Claims, 2 Drawing Sheets

METHOD FOR APPLYING A WELD OVERLAY TO A WASTAGE SUSCEPTIBLE STRUCTURE

BACKGROUND OF THE INVENTION

The present invention relates to a method for applying a weld overlay to a wastage susceptible structure.

According to U.S. Pat. No. 5,356,248 to Hillestad, steam generating boilers, such as those used at electrical power generating plants, are generally large steel or masonry structures containing hundreds of vertically arranged steel tubes which are in thermal contact with a burning fuel, such as coal. The burning fuel heats water circulated through the tubes. The heated water or steam is used to drive turbines which generate electricity.

Additionally, according to the '248 patent, the tubes are generally organized in large panels or banks of parallel tubes which are connected together with a metal membrane or web continuously interposed between each pair of adjacent tubes in the bank to form a tube wall. In a steam generator, the tubes are generally oriented in a vertical direction and are communicated with headers at their ends. Due to their exposure to relatively high temperature water and steam, these tubes are susceptible to corrosion mechanisms that can ultimately lead to significant tube wall thinning or even leakage.

One approach to repairing or preventatively strengthening the tubes of a steam generator involves the deposition of weld metal at locations of the tubes observed or otherwise judged to have a reduced thickness less than a desired tube thickness. However, the build up of weld metal to thereby form a corrosion resistant weld overlay presents installation and structural challenges. For example, since a field applied weld overlay is typically applied during a shutdown of the steam generator, it is desirable to accomplish the set up and operation of the weld equipment as rapidly as possible so as to limit the revenue loss downtime of the steam generator. The speed of the weld deposition, however, must take into account the tube structure impact which the weld operation may have. For example, tube panels may tend to deform due to the difference in temperature between the furnace side of the tube being welded and the relatively cooler, insulated exterior side of the tube. Moreover, shrinkage of the weld overlay can sometimes engender a deformation of the tube panel, thereby causing increases in the stresses exerted on the structural framework supporting the tubes. Furthermore, residual stress from the welding operation can sometimes result in thermal fatigue cracking of the weld overlay and the tube portions underlying and adjacent the weld overlay region.

SUMMARY OF THE INVENTION

It is one object of the present invention to provide a method for applying a weld overlay to a surface of a wastage susceptible chamber in a manner which reduces the deformation and stresses imposed on the surface in contrast to conventional weld overlay applications.

It is another object of the present invention to provide a method for repairing a surface of a wastage susceptible chamber such as a steam generator without significant disruption of the normal operation of the chamber.

It is an object of the present invention to provide a method for prolonging the useful life of certain components of a wastage susceptible chamber, such as the tubes of a steam generator.

According to one aspect of the present invention, there is provided a method of applying a weld overlay to a surface of a wastage susceptible chamber. The basic steps of the method include evaluating the post weld orientation of the surface of the wastage susceptible chamber resulting from the movement of the surface in response to the application of a weld overlay thereon and selecting characteristics of a weld overlay to be applied to the surface of the wastage susceptible chamber based upon the step of evaluating the post weld orientation of the surface of the wastage susceptible chamber. The basic steps of the method also include determining a series of weld torch engagement locations relative to the surface of the wastage susceptible chamber at which a weld torch is to be located for performing thereat welding operations which result in a weld overlay on the surface having characteristics corresponding to the predetermined weld overlay characteristics. A further basic step of the method includes positioning a weld torch at the weld torch engagement locations and controlling the weld torch to produce welds on the surface of the wastage susceptible chamber resulting in the weld overlay having characteristics corresponding to the predetermined weld overlay characteristics.

According to one refinement of the method for implementation of the method on a wastage susceptible chamber wherein the surface of the wastage susceptible chamber is supported at a plurality of support locations by a support frame each of which restrain the movement of the surface in response to the application of a weld overlay thereon, the step of evaluating the post weld orientation of the surface of the wastage susceptible chamber includes evaluating the post weld orientation of other locations of the surface which are spaced from the support locations.

In the event that the wastage susceptible chamber includes a plurality of tubes each operable to conduct fluid therethrough during thermally varying operation of the chamber and the surface is comprised of outer surface portions of adjacent tubes, the step of evaluating the post weld orientation of the surface of the wastage susceptible chamber may include evaluating the movement of the outer surface portions of the adjacent tubes in response to the application of a weld overlay thereon.

In another refinement of the method of the present inventions, the step of selecting characteristics of a weld overlay to be applied to the surface of the wastage susceptible chamber includes selecting the characteristic that the weld overlay is applied in at least two temporally spaced phases, the first phase of the application of the weld overlay including applying at least one first phase weld strip which induces predetermined stresses in the surface and applying at least one second weld strip which induces predetermined stresses in the surface which at least partially mitigate the predetermined stresses induces by the application of the at least one first phase weld strip.

DETAILED DESCRIPTION OF THE PREFERRED EMBODIMENT

Figure 1:
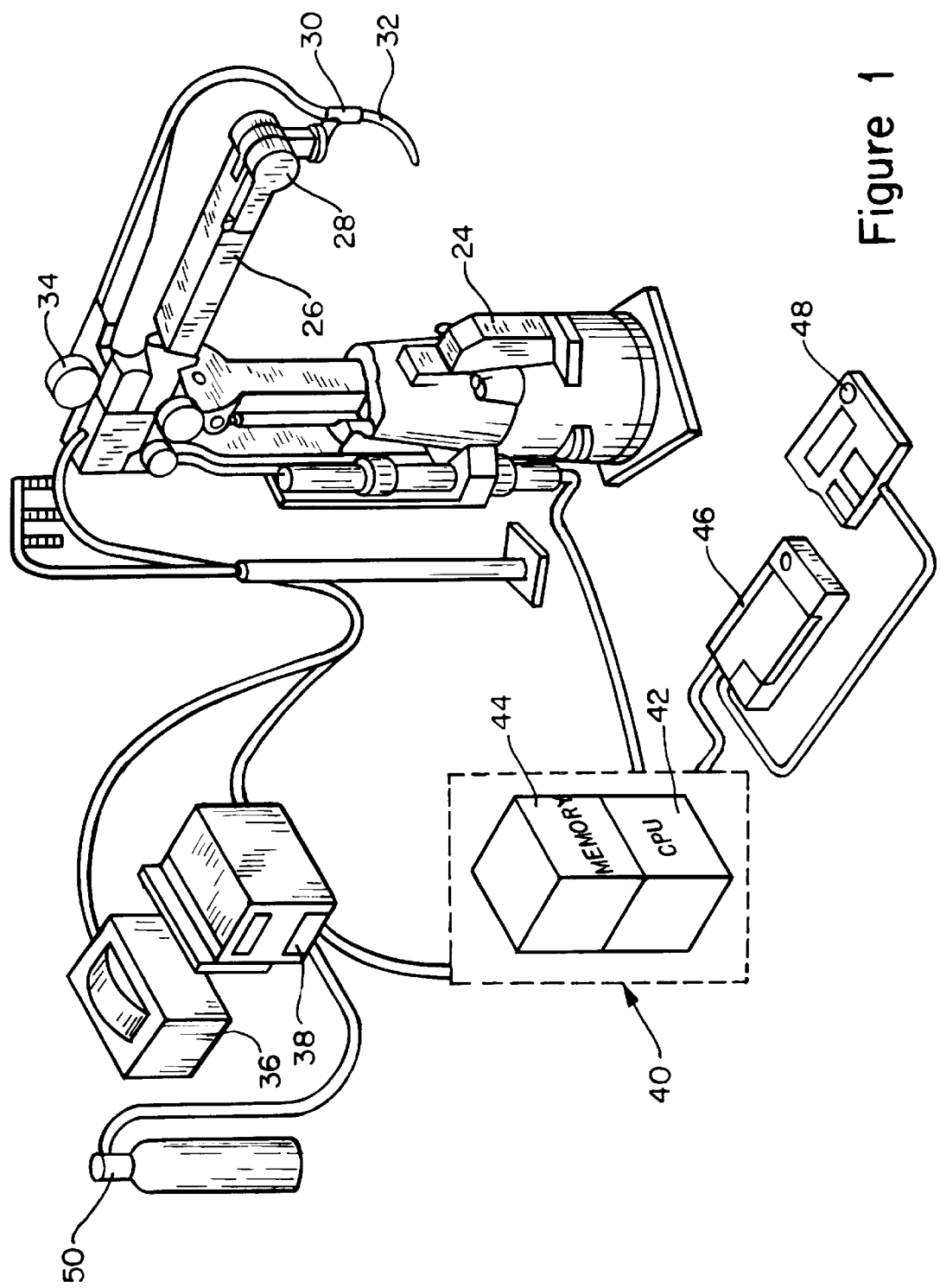
FIG. 1 is a perspective schematic view of a portion of a wastage susceptible chamber and a programmable robot welding apparatus for applying a weld overlay to the portion of the wastage susceptible chamber in accordance with the method of the present invention.

In the furnace of a fossil fuel fired steam generator or a petrochemical treatment facility such as a catalytic cracking chamber, variations in temperature or relatively high or low temperature regimes can detrimentally contribute to wastage or loss of material on the chamber enclosure structures such as floor, wall or roof panels or on interior heat exchange surfaces. These components may be desirably repaired or preventatively strengthened by the application of a weld overlay on their surfaces which restores some or all of the original thickness of the component. FIG. 1 exemplarily illustrates an arrangement for implementing the method of the present invention of applying a weld overlay to a surface of a wastage susceptible chamber. As seen in FIG. 1, a waterwall tube section 10 of a vertical wall of a furnace of a fossil fuel fired steam generator is structurally supported by a support framework 12. The waterwall tube section 10 includes a plurality of parallel vertical tubes 14 fixedly spaced from, and interconnected to, one another by webbing 16.

The support frame 12 is comprised of a plurality of vertical posts 18 and a plurality of parallel horizontal beams 20 each connected on one side to the vertical posts 18 and on an opposite side to the webbing 16 by a plurality of connector bolts 22. Fluid in the form of water, water and steam, or steam flows through the vertical tubes 14 while fuel is combusted in the furnace. Thus, the furnace sides of the vertical tubes 14 are subjected to temperatures in ranging between a few hundred degrees Fahrenheit to more than one thousand degrees Fahrenheit. Corrosion effects, structural tube weaknesses, and slag deposits on the tubes can lead to material loss or wastage on the furnace side of the vertical tubes 14 and the present invention proposes a method for applying a weld overlay to remediate or slow the detrimental impact of wastage on the vertical tubes 14.

The weld overlay application method is preferably performed by a programmable robot welding apparatus which is of a size and weight which permits the apparatus to be readily positioned at work positions or traveled along a work travel path relative to the vertical tubes 14. To facilitate a description of the desirable functions such a programmable robot welding apparatus would comprise, FIG. 1 illustrates in exaggerated scale a version of a programmable robot welding apparatus, hereinafter designated by the reference numeral 24, capable of implementing the weld overlay application method of the present invention. It is to be understood, however, that the programmable robot welding apparatus 24 can be configured in reduced scale so as to be of a suitable size and weight for deployment while supported by, for example, a multiple axis gantry system or scaffolding system.

The programmable robot welding apparatus 24 includes an articulating arm 26 and an articulating wrist 28 movably mounted to the free end of the arm 26. A welding torch 30 is mounted to the wrist 28 and includes a welding electrode 32. A wire feed device 34 is mounted to the top of the arm 26 for feeding consumable weld filler wire from a wire spool 36 to the welding torch 30. The welding electrode 32 is connected to an electric power source 38 which provides electrical power through the welding electrode 32 so as to create an arc between the welding electrode and the tube surface onto which the weld overlay is being deposited. The programmable robot welding apparatus 24 is operatively connected to a data processor which may be in the form of a personal computer (PC) 40 having a central processing unit 42 and a memory 44. A keyboard 46 is connected to the personal computer (PC) 40 to allow operator control of the programmable robot welding apparatus 24. A weld sensing unit 48 is coupled to the personal computer (PC) 40 via the keyboard 46 for providing tracking information concerning the position of the welding electrode 32 relative to the weld overlay region on the vertical tubes 14. An inert gas supply 50 supplies inert gas to the welding torch 30.

The welding torch 30 of the programmable robot welding apparatus 24 is thus controlled via the personal computer (PC) 40 to move to selected weld torch engagement locations relative to the furnace side surfaces of the vertical tubes 14 at which the welding torch performs a welding operation. The weld metal is initially deposited on a vertical tube surface at a weld temperature at which the weld metal is molten. Thereafter, the weld metal solidifies as it cools and the solidification of the weld metal is accompanied by shrinkage of the weld metal which imposes distortion and stresses on the underlying vertical tube surface. Thus, it can be appreciated that the temperature profile, total amount, and thickness distribution of the weld metal influence the magnitude and orientation of these distortion and stresses. In turn, the temperature profile, total amount, and thickness distribution of the weld metal is controlled by several factors including the orientation and spacing of the welding electrode 32 relative to the surface of the respective vertical tube 14, the rate of feed of the wire to the welding electrode, the movement pattern of the welding electrode including the weaving and dwelling thereof, and geometry and material characteristics of the underlying tube surface.

In the most basic implementation of the weld overlay application method of the present invention, the method determines a series of weld torch engagement locations relative to the surface of the tube such that the movement of the tube surface resulting in the distortion and stresses just noted is favorably influenced—that is, the distortion and stresses are less as compared with another possible series of weld torch locations. The method includes the step of evaluating the post weld orientation of the surface of the tube which results from the movement of the tube surface in response to the weld overlay thereon. This step can be implemented in connection with the programmable robot welding apparatus 24 shown in FIG. 1 by, for example, programming the personal computer (PC) 40 to iteratively simulate or predict the influence that different weld overlay applications will have on the movement of the surfaces of the vertical tubes 14. In this implementation, empirical information concerning observed or predicted characteristics of weld metals and the tube surfaces can be provided in the form of databases stored in the memory 44 which can be accessed during the execution of computer applications such as finite element analysis.

The method also includes the step of selecting characteristics of a weld overlay to be applied to the surface of the wastage susceptible chamber based upon the step of evaluating the post weld orientation of the surface of the wastage susceptible chamber. This step of the method can be implemented by the programmable robot welding apparatus 24 shown in FIG. 1 by, for example, executing a computer program to generate a selection of weld overlay characteristics as a function of the post weld orientation of the surfaces of the vertical tubes 14 predicted by, for example, a finite element analysis program. The selected weld overlay characteristics may include, for example, the characteristic of a particular horizontal or vertical "weaving" pattern which the welding torch 30 is to follow as its work travel path or the characteristic of the rate of wire feed during the welding operation. The basic implementation of the weld overlay application method then includes the step of determining a series of weld torch engagement locations relative to the surface of the wastage susceptible chamber at which a weld torch is to be located for performing thereat welding operations which result in a weld overlay on the surface having characteristics corresponding to the predetermined weld overlay characteristics. With respect to the programmable robot welding apparatus 24 shown in FIG. 1, the step of determining a series of weld torch engagement locations can be implemented by the personal computer (PC) 40, which can then control the movement of the welding torch 30 to position the welding torch 30 to the determined series of weld torch engagement locations for performing welding thereat. The last step of the basic implementation of the method is the step of positioning a weld torch at the weld torch engagement locations and controlling the weld torch to produce welds on the surface of the wastage susceptible chamber resulting in the weld overlay having characteristics corresponding to the predetermined weld overlay characteristics. In the event that the surface of the wastage susceptible chamber is supported at a plurality of support locations by a support frame each of which restrain the movement of the surface in response to the application of a weld overlay thereon, a refinement of the method of the present invention includes the step of evaluating the post weld orientation of other locations of the surface which are spaced from the support locations. The support frame 12 of the furnace 10 shown in FIG. 1 supports the vertical tubes 14 and the webbing 16 at the plurality of support locations formed by the connector bolts 22 and the personal computer (PC) 40 can be configured to evaluate the distortion and stresses which may occur, for example, mid-way between adjacent pairs of the connector bolts 22.

Figure 2:
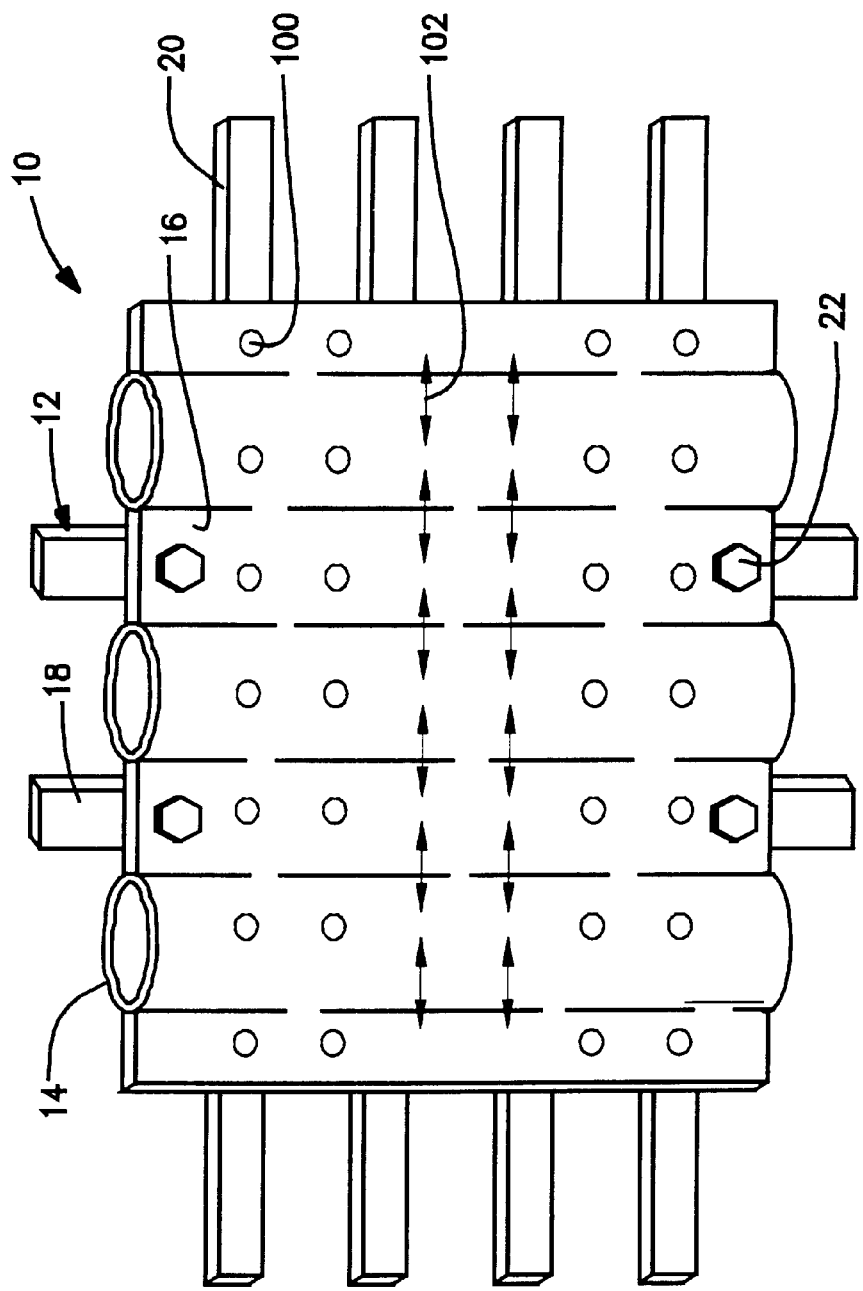
FIG. 2 is a perspective schematic view of a portion of a wastage susceptible chamber having a selected weld overlay applied in accordance with a refinement of the method of the present invention.

Reference is now had to FIG. 2 for a description of another refinement of the weld overlay application method. As seen in FIG. 2, the waterwall tube section 10 shown in FIG. 1 is provided with a weld overlay application in accordance with a refinement of the method. In this refinement, the step of selecting characteristics of a weld overlay to be applied to the surface of the wastage susceptible chamber includes selecting the characteristic that the weld overlay is applied in at least two temporally spaced phases. The first phase of the application of the weld overlay includes applying at least one first phase weld strip which induces predetermined stresses in the surface. As seen in FIG. 2, a first series of horizontal weld bands 100, shown in dash-dot lines, are applied by the welding torch 30 to the surfaces of the vertical tubes 14 at locations thereon which are vertically coincident with the horizontal beams 20. Thereafter, a second phase of the application of the weld overlay includes applying at least one second weld strip which induces predetermined stresses in the surface which at least partially mitigate the predetermined stresses induces by the application of the at least one first phase weld strip. As seen in FIG. 2, a second series of horizontal weld bands 102, shown in double arrow broken lines, are applied by the welding torch 30 to the surfaces of the vertical tubes 14 at locations thereon which are not vertically coincident with the horizontal beams 20. Thus, the method includes, in this refinement, controlling the weld torch to produce welds on the surface of the wastage susceptible chamber in at least two temporally spaced phases, the first phase of the application of the weld overlay including applying at least one first phase weld strip which induces stresses in the surface in a first orientation and applying at least one second weld strip which induces stresses in the surface which at least partially counteract the stresses induced by the application of the at least one first phase weld strip such that the magnitude of the residual stresses generally in the first orientation in the surface after the completion of the weld overlay application is relatively less than the stresses induced in the first direction by the application of the at least one first phase weld strip.

The weld overlay application method can be enhanced, in some circumstances, by the use of a tracking system associated with the welding apparatus for sensing or tracking the position of the welding torch to the surface being welded. Such a tracking system may be particularly useful for steam generator waterwall panels having relatively complex topographies. Additionally, the weld overlay application method can be enhanced, in some circumstances, by the use of off-line programming which permit analysis and instruction downloading to the unit controlling the welding apparatus (i.e., the personal computer (PC) 40) to be accomplished prior to the shutdown of the wastage susceptible chamber for the weld application operation.

While several variations of an embodiment of the invention have been shown, it will be appreciated that modifications thereof, some of which have been alluded to hereinabove, may still be readily made thereto by those skilled in the art. It is therefore intended by the appended claims to cover the modifications alluded to herein as well as all the other modifications which fall within the true spirit and scope of the invention.

We claim:

1. A method of applying a weld overlay to a surface of a wastage susceptible chamber, comprising:

evaluating the post weld orientation of the surface of the wastage susceptible chamber resulting from the movement of the surface in response to the application of a weld overlay thereon;

selecting characteristics of a weld overlay to be applied to the surface of the wastage susceptible chamber based upon the step of evaluating the post weld orientation of the surface of the wastage susceptible chamber;

determining a series of weld torch engagement locations relative to the surface of the wastage susceptible chamber at which a weld torch is to be located for performing thereat welding operations which result in a weld overlay on the surface having characteristics corresponding to the predetermined weld overlay characteristics; and positioning a weld torch at the weld torch engagement locations and controlling the weld torch to produce welds on the surface of the wastage susceptible chamber resulting in the weld overlay having characteristics corresponding to the predetermined weld overlay characteristics.

2. A method according to claim 1 wherein the surface of the wastage susceptible chamber is supported at a plurality of support locations by a support frame each of which restrain the movement of the surface in response to the application of a weld overlay thereon and the step of evaluating the post weld orientation of the surface of the wastage susceptible chamber includes evaluating the post weld orientation of other locations of the surface which are spaced from the support locations.

3. A method of applying a weld overlay to a surface of a wastage susceptible chamber according to claim 2 wherein the step of selecting characteristics of a weld overlay to be applied to the surface of the wastage susceptible chamber includes selecting the characteristic that the weld overlay is applied in at least two temporally spaced phases, the first phase of the application of the weld overlay including applying at least one first phase weld strip which induces predetermined stresses in the surface and applying at least one second weld strip which induces predetermined stresses in the surface which at least partially mitigate the predetermined stresses induces by the application of the at least one first phase weld strip.

4. A method of applying a weld overlay to a surface of a wastage susceptible chamber according to claim 1 wherein the step of evaluating the post weld orientation of the surface of the wastage susceptible chamber includes predicting the post weld orientation of the surface.

5. A method of applying a weld overlay to a surface of a wastage susceptible chamber according to claim 1 wherein the wastage susceptible chamber includes a plurality of tubes each operable to conduct fluid therethrough during thermally varying operating of the chamber and the surface is comprised of outer surface portions of adjacent tubes, the step of evaluating the post weld orientation of the surface of the wastage susceptible chamber includes evaluating the movement of the outer surface portions of the adjacent tubes in response to the application of a weld overlay thereon.

6. A method of controlling a weld torch to apply a weld overlay on a surface of a wastage susceptible chamber, comprising:

controlling the weld torch to produce welds on the surface of the wastage susceptible chamber in at least two temporally spaced phases, the first phase of the application of the weld overlay including applying at least one first phase weld strip which induces stresses in the surface in a first orientation and applying at least one second weld strip which induces stresses in the surface which at least partially counteract the stresses induced by the application of the at least one first phase weld strip such that the magnitude of the residual stresses generally in the first orientation in the surface after the completion of the weld overlay application is relatively less than the stresses induced in the first direction by the application of the at least one first phase weld strip.

\* \* \* \* \*